United States Patent Office 3,585,665
Patented June 22, 1971

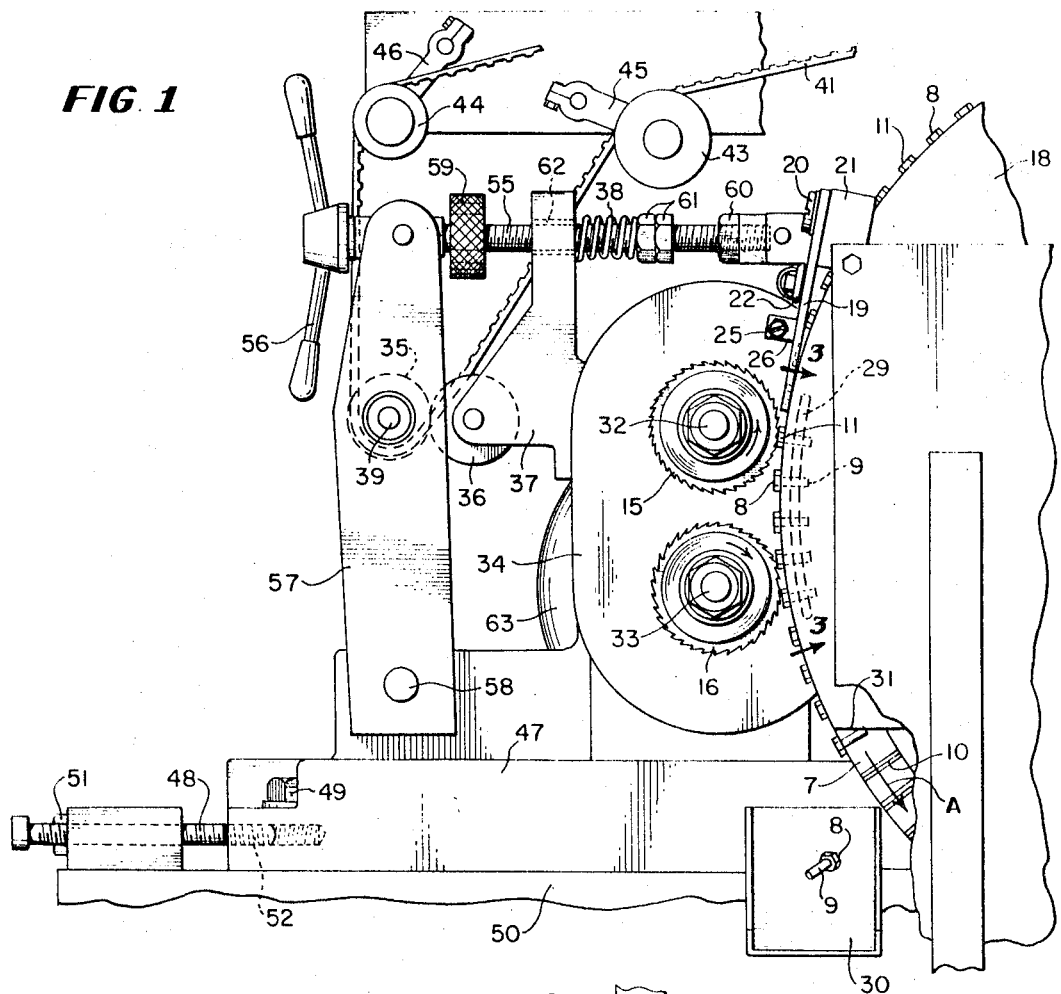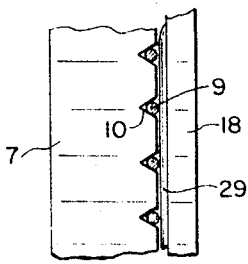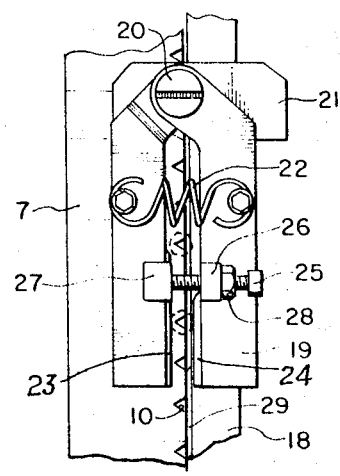

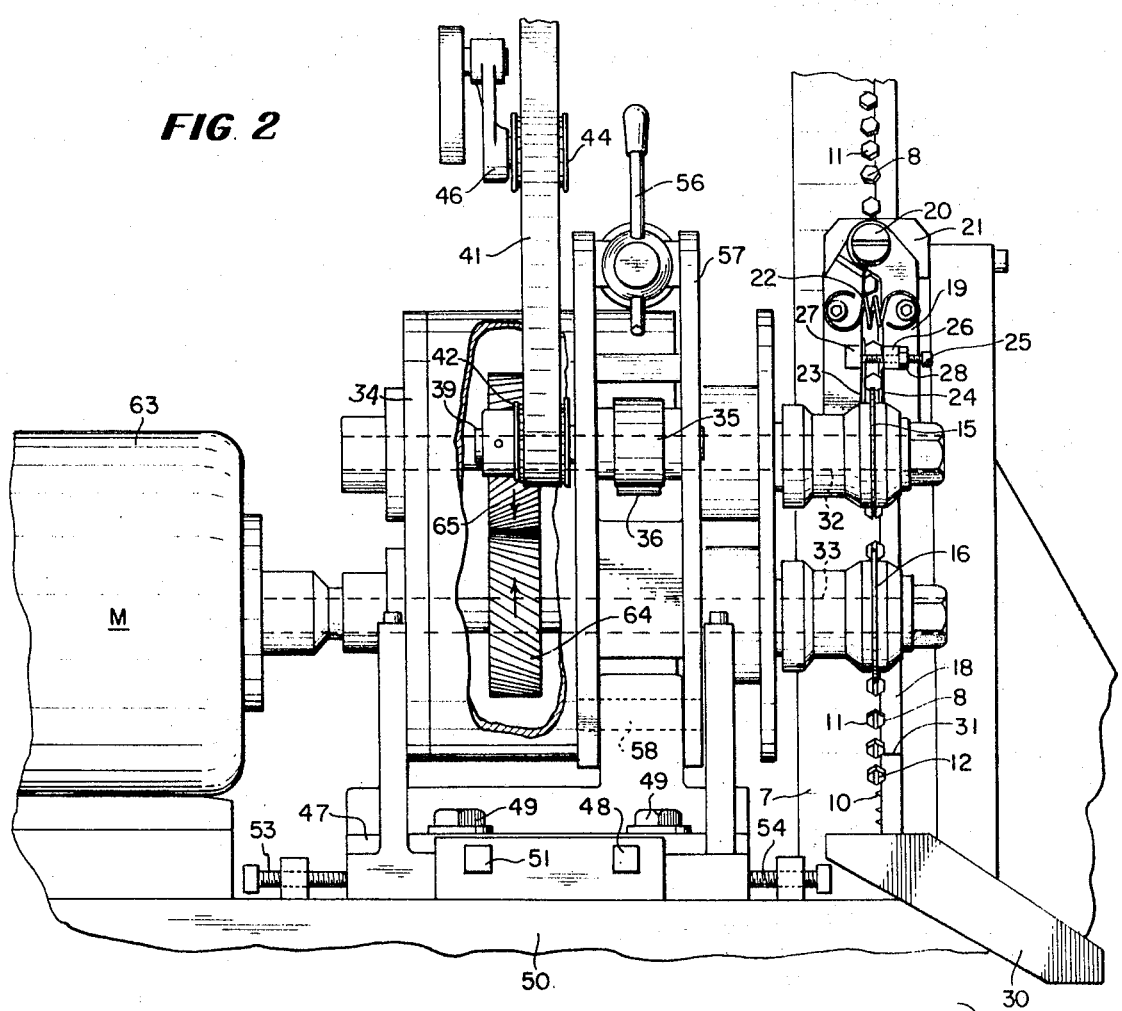

3,585,665
SCREW SLOTTING MACHINE
Warren M. Jackson, 5013 Sovereign Blvd.,
Rockford, Ill. 61108
Filed June 25, 1969, Ser. No. 836,245
Int. Cl. B23g 9/00
U.S. Cl. 10—6
16 Claims

ABSTRACT OF THE DISCLOSURE

Two circular saw blades of the same diameter are employed in spaced coplanar relationship turning in opposite directions. The first saw is thinner and cuts a preliminary slot along a wavy line as a result of its being oscillated slightly in the plane of cutting, and it leaves a burr at the outgoing end of the slot which is at a slight elevation relative to the ultimate bottom of the slot. The second saw is thicker and makes a finish cut to the desired width and, due to climb cutting, clips off the burr left by the first saw, so that the slotted screws are substantially free of burrs. Since the first saw is oscillated about the axis of the second saw it is possible to adjust the depth of the first cut to the desired extent, although both saws may be adjusted together toward the work to compensate for wear on the saws, and later away from the work when new saws are installed. An aligner may be provided using the flats on the hex-heads for aligning to insure cutting of the slots the large diameter from point to point of the hex.

This invention relates to a new and improved screw slotting machine and has for its principal object the provision of a slotter capable of producing substantially burrless slots or at least slots with .003" burrs or less, which are virtually negligible and are easily removed with a minimum amount of tumbling.

A further object is also to greatly increase the production of the improved product, production of at least double the usual amount having been achieved without difficulty.

Salient features of the present invention are:

(1) The use of two circular saws of the same diameter in spaced coplanar relation, turning in opposite directions, the first, which is thinner, turning counter-clockwise and cutting a narrower initial slot leaving a projecting burr where it leaves the end of the slot as the screw head passes the saw, and the other, which is thicker, performing the finishing cut to produce a full width slot, this saw turning in a clockwise direction for climb cutting to dispose of the burr at the end of the slot as the screw head passes the second saw, and (2) The two circular saws are carried on a single head that is oscillated slightly about the axis of the second saw so that the first saw turning counterclockwise and entering at full depth cuts along a wavy line to be certain of leaving the burr at such an elevation relative to the outgoing end of the slot to be certain of its being clipped off by the climb cutting second saw turning clockwise and operating along a substantially straight line and not only widening the slot to the full width but also routing out the slot along the bottom on a substantially straight line to produce clean slots of substantially uniform depth from end to end.

The invention is illustrated in the accompanying drawings, in which:

FIG. 1 is a side view of enough of a screw slotting machine to satisfactorily illustrate the improvements of my invention;

FIG. 2 is a front view of FIG. 1, with a portion of the gear housing broken away to better illustrate the construction and mode of operation;

FIG. 3 is a fragmentary detail on the arcuate line 3—3 of FIG. 1, namely, along the periphery of the rotary dial and cooperating stationary side plate;

FIG. 4 is an enlarged front view of the screw head aligner, which in the case of the hex-heads insures slotting the long dimension from point to point diametrically of the head, using opposed flats on the head for aligning purposes;

FIG. 5 is a diagrammatic illustration of the two circular saws showing by angularly related center lines and also by full line and dotted line illustrations of the oscillated first saw the movement of the first saw with respect to the second saw, the extent of oscillation being exaggerated for purposes of better illustration;

FIG. 5A illustrates by the showing of two screwheads, one with the narrower rough cut of the first saw with the burr at the outgoing end and the other with the finish cut of the second saw leaving no burr, or substantially none, and FIG. 6 is a diagrammatic illustration of the two circular saws of my invention, showing above the rough cutting of the oscillated first saw along a wavy line and below the finish cutting of the second saw along a substantially straight line.

The same reference numerals are applied to corresponding parts throughout the views.

Referring to the drawings, the reference numeral 7 designates the dial, which, as indicated by arrow A in FIG. 1, turns in a counterclockwise direction carrying screws 8 by their shank portions 9 in radial notches 10 while the heads 11 are being slotted diametrically, as at 12 in FIGS. 2 and 5A, the long dimension from one of the points 13 to the diametrically opposite one, the screws being aligned by means of opposed flats 14 on the heads 11 preliminary to the slotting, as will presently appear, and after being so aligned being gripped firmly by the shank portions 9 during the slotting operation. This is a two-stage operation, in the first of which a thinner circular saw 15 cuts a narrow slot 12' (FIG. 5A) of irregular depth as illustrated by the wavy line a–b in FIG. 6, leaving the burr c where the saw leaves the end of the slot as the screw head passes saw 15, the wavy line motion of saw 15 being due to the oscillation of this saw indicated by the center lines X and X, in FIG. 5, which insures having the burr c at such an elevation with respect to the ultimate bottom of the slot 12 as shown in FIG. 5A to be certain of its being clipped off by the climb cutting second circular saw 16. The latter is thicker than saw 15 and operates along the substantially straight line d–e, shown in FIG. 6, to not only widen the slot 12' to the full width shown at 12 in FIG. 5, but also rout out along the bottom of the slot its full length, and, in so doing, clip off the burr c at the end of the slot. Line d–e should be described as only a substantially straight line as, of course, the screwheads 11 are moved past the two saws 15 and 16 on a radius of about 10 inches, the dial 7 being of a 20-inch diameter. Flanges 17 are shown on the heads 11 in FIGS. 5A and 6 but it will soon appear that the present machine can operate just as efficiently on screws with as without such flanges. Saw 15 turns in a counterclockwise direction to insure having the burr c at the outgoing end of the slot 12', while saw 16 turns in a clockwise direction to insure its clipping off the burr c as it completes the widening and routing out of the slot 12 to its full length.

The stationary side plate 18, relative to which the dial 7 turns, provides adequate clearance for the shanks 9 of the screws 8 as the screw blanks are fed to the dial 7 head up and shank down into the notches 10 of the dial. This looseness of the screws facilitates the aligning of heads 11 between the legs of the aligner 19 that is disposed tangent to the dial 7 as seen in FIG. 1 and straddles the space between the dial 7 and side plate 18 as seen in FIG. 2, the two legs of the aligner being pivoted at their upper ends, as at 20, in the plane of the clearance space between the dial and side plate on a suitable fixed support 21 on the side plate and being urged toward one another by a coiled tension spring 22 to align the flat 14 on one side of each head first by means of a rib 23 on the inner side of one leg of the aligner 19 and later by engagement with another rib 24 on the inner side of the other leg shortly before the screwhead arrives at the saw 15 in the turning of the dial 7. An adjusting screw 25 threaded in a lug 26 on one leg of the aligner 19 and abutting a lug 27 on the other leg limits the closing of the aligner. A lock nut 28 on the screw 25 serves by abutment with the lug 26 to maintain the adjustment. It should be clear that since the aligner 19 works on the flats 14 it makes no difference so far as this aligner is concerned whether the heads 11 are as seen in FIGS. 1 and 2 or have flanges 17 as in FIG. 5A. The aligning of the heads 11 by means of the flats 14 insures having the preliminary slot 12' cut diametrically of the head from one point 13 to the other as seen in FIG. 5A, when that is wanted. Slotting may, of course, be done without such alignment. Promptly after the screwhead 11 engages the rib 24 and while the screwhead is still aligned between the two ribs 23 and 24, one side of the shank 9 comes into tight engagement with an elongated hardened rib 29 provided on the inner side of the side plate 18 to hold the screw 8 jammed in the notches 10 throughout the slotting operation so there is no danger of the screwhead losing its alignment, the shank 9 sliding along the inner face of this hardened rib 29 from a point slightly ahead of the cutting of the preliminary slot 12' by saw 15 to a point slightly beyond where the saw 16 makes the finishing cut of slot 12 as is quite clearly shown in FIG. 1. This gripping is important whether the aligner 19 is used or not. The slotted screws leaving the saw 16 are, therefore, just as loosely engaged in notches 10 as they were at the point of being dropped into the notches from the feed mechanism (not shown). Hence, they are adapted to drop off the dial 7 onto a discharge chute 30 which can be disposed at any convenient location with respect to the lower half of the dial 7 where the slotted screws will drop by gravity into the chute, or, as shown in FIG. 1, the side plate 18 may have its lower edge 31 or that of a cut away portion so located with respect to the chute as to insure gravity dropping of the slotted screws into the chute 30 as soon as they emerge from behind the side plate 18.

The vertically spaced parallel horizontal spindles 32 and 33, on which the saws 15 and 16 are mounted, have bearing support in a head 34 that is oscillatable in a vertical plane about the horizontal axis of spindle 33 by means of a rotary cam 35 and follower roller 36, the latter being mounted in a bracket 37 fixed to the head 34 and having a coiled compression spring 38 bearing against the back of it to urge the head 34 to swing outwardly, keeping the roller 36 in tight contact with the cam 35, which, once per revolution, urges the head 34 to swing inwardly to the extent of .020" to .025" oscillation indicated at O in FIG. 5 between the two center lines X and X₁. It is, of course, important that the spindle 39 turn the cam 35 once per screw 8 and, of course, also in proper timed relationship to the arrival of each screwhead 11 at the saw 15 so as to have the peaks 40 on the curved line a–b at the outgoing end of each slot 12', in order to locate the burr c correctly in relation to the plane of the substantially straight line d–e along which the saw 16 operates, so as to be certain of its clipping off the burr in the climb cutting operation of saw 16. Such driving of the cam 36 is assured by a drive belt 41 driving the pulley 42, this drive belt being driven by a pulley (not shown) the speed of which bears the right relationship to the driving of the dial 7 to give one turn to cam 35 per notch 10 in the dial. Idler pulleys 43 and 44 carried on adjustably fixed crank arms 45 and 46, respectively, are necessary for restoring the proper tension in the drive 41 when the base 47 is adjusted forwardly by a screw 48, as when there is need for compensating for wear of the saws 15 and 16 so as to keep both saws slotting to the full desired depth. Bolts 49 that clamp the base 47 to the bed 50 extend through parallel slots in the base 47 and have to be loosened when such an adjustment is made and thereafter tightened again. Screw 51 threads into a hole 52 in base 47, and is used for adjusting the base in the opposite direction, as when new saws are provided at 15 and 16 and readjustment of the machine is necessary. Lateral adjustment of the base 47 for accurately aligning the saws 15 and 16 with respect to the screwheads can be made in any suitable way, as by screws 53 and 54, the parallel slots receiving the bolts 49 being wide enough to allow for this minor adjustment. A screw 55 operable by hand wheel 56 pivotally adjusts the bracket 57 about its supporting pivot 58 to predetermine very closely the depth to which the saw 15 will cut in making the preliminary slot 12', lock nuts at 59 and 60 being tightened to maintain the fine adjustment. Nuts 61 threading on the screw 55 serve to back up the spring 38, and these can be adjusted to maintain the desired spring loading of bracket 37 and head 34, the bracket 37, as indicated at 62, having ample clearance with respect to the screw 55 so as not to interfere with the freedom of oscillation of the bracket 37 with the head 34.

An electric drive motor 63 is directly coupled to the spindle 33 to transmit clockwise rotation to the saw 16, while a gear 64 fixed on spindle 33 transmits drive to spindle 32 through another gear 65 to turn saw 15 in a counterclockwise direction at the same speed as saw 16.

It is believed the foregoing description conveys a good understanding of the objects and advantages of my invention. While a preferred embodiment of the invention has been illustrated and described, this is only for the purpose of illustration, and it is to be understood that various modifications in structure will occur to a person skilled in this art.

I claim:

1. In a screw slotting machine two spaced coplanar rotary circular saws, means for reciprocating the first saw in the plane of its rotation during operation of said saw for cutting the screw head along a substantially sinusoidal line substantially tangent to the second saw to an extent that is small in relation to the final depth of cutting in a slotting operation, means for driving said saws in opposite directions, the second saw being mounted for cutting along a substantially straight line substantially tangent to the first saw, and means for holding a screw in the plane of said saws by its shank against turning while moving the screw so that its head travels in a substantially straight line continuously in one direction toward and past said first and second saws for a diametrical slotting of said head.

2. A screw slotting machine as set forth in claim 1 wherein the first saw has a smaller cutting width than the second saw.

3. A screw slotting machine as set forth in claim 1 wherein the first saw has a smaller cutting width than the second saw, but is arranged to cut the preliminary narrow slot substantially on the center line of the slot made in the finishing cut by the second saw.

4. A screw slotting machine as set forth in claim 1 wherein the second saw is a climb cutting saw and the first mentioned means is so timed in relation to the last mentioned means as to have the first saw at the entry end of the slot cut substantially to the full ultimate depth of the slot but at the outgoing end cut substantially less than the full depth, whereby the climb cutting second saw is always certain to clip off any burr at the outgoing end of the slot produced by the first saw.

5. A screw slotting machine as set forth in claim 1 wherein the first saw has a smaller cutting width than the second saw, and wherein the second saw is a climb cutting saw and the first mentioned means is so timed in relation to the last mentioned means as to have the first saw at the entry end of the slot cut substantially to the full ultimate depth of the slot but at the outgoing end cut substantially less than the full depth, whereby the climb cutting second saw is always certain to clip off any burr at the outgoing end of the slot produced by the first saw.

6. A screw slotting machine as set forth in claim 1 wherein said saws are mounted on parallel spindles in a head that oscillates in a plane parallel to the plane of said saws about the axis of said second saw to reciprocate said first saw.

7. A screw slotting machine as set forth in claim 1 wherein said saws are mounted on parallel spindles in a head that oscillates in a plane parallel to the plane of said saws and wherein the means for reciprocating said first saw comprises a rotary cam on a fixed support, a follower roller carried by said head and engaging said cam, and spring means urging said head and follower roller toward said cam.

8. A screw sloting machine as set forth in claim 1 wherein said saws are mounted on parallel spindles in a head that oscillates in a plane parallel to the plane of said saws and wherein the means for reciprocating said first saw comprises a rotary cam on a fixed support, a follower roller carried by said head and engaging said cam, and spring means urging said head and follower roller toward said cam, there being also means for adjusting the support for said rotary cam to vary the depth of cutting of said first saw independently of said second saw.

9. A screw slotting machine as set forth in claim 1 wherein said saws are mounted on parallel spindles in a head that oscillates in a plane parallel to the plane of said saws and wherein the means for reciprocating said first saw comprises a rotary cam on a fixed support, a follower roller carried by said head and engaging said cam, and spring means urging said head and follower roller toward said cam, there being also means for adjusting said head and cam support as a unit toward the screw holding and moving means to compensate simultaneously for wear of the two saws.

10. A screw slotting machine as set forth in claim 1 wherein the screw holding and moving means comprises a rotary dial turning in a plane parallel to the plane of said saws and having spaced substantially radial notches in one side face thereof adapted to receive the shanks of screws with the heads thereof exposed on the periphery of said dial for slotting by said saws, and a stationary side plate parallel to and alongside the notched side face of said dial, said side plate having a rib projecting therefrom toward said dial along which the shanks of screws engaged in said notches are slidable while pressed by said rib into said notches to prohibit turning of the heads in the movement past the two saws in the slotting operation.

11. A screw slotting machine as set forth in claim 1 including means slidably engaged by the flats on the side of screw heads for aligning heads of screws in a predetermined relationship to the saws while the screws are free to turn prior to the shanks being held against turning.

12. A screw slotting machine as set forth in claim 10 including means slidably engaged by the flats on the sides of screw heads for aligning the heads of screws in a predetermined relationship to the saws while the screws are free to turn in said notches prior to the shanks engaging said rib so as to be held against turning.

13. A screw slotting machine as set forth in claim 10 including a bifurcated aligner suitably supported in a fixed relationship to said side plate straddling the space between said dial and side plate and having one leg with an aligning surface on its inner side parallel to said side plate to be slidably engaged by a flat on the side of a screw head, and another leg with another aligning surface substantially parallel to the first surface to be thereafter slidably engaged by another flat on the diametrically opposite side of the screw head, whereby to align said screw head in a predetermined relationship to said saws before the screw is held against turning.

14. A screw slotting machine as set forth in claim 10 including a bifurcated aligner suitably supported in a fixed relationship to said side plate straddling the space between said dial and side plate and having one leg with an aligning surface on its inner side parallel to said side plate to be slidably engaged by a flat on the side of a screw head, and another leg with another aligning surface substantially parallel to the first surface to be thereafter slidably engaged by another flat on the diametrically opposite side of the screw head, whereby to align said screw head in a predetermined relationship to said saws before the screw is held against turning, said legs being pivoted relative to one another at one end and resiliently urged toward one another.

15. A screw slotting machine as set forth in claim 8 wherein the second saw is a climb cutting saw and said cam is given one turn per screw head slotted by said first saw, said cam being so timed relative to the last mentioned means and so disposed relative to the screw head being slotted as to have the first saw at the entry end of the slot cut substantially to the full ultimate depth of the slot but at the outgoing end cut substantially less han the full depth, whereby the climb cutting second saw is always certain to clip off any burr at the outgoing end of the slot produced by the first saw.

16. A screw slotting machine as set forth in claim 1 wherein the first saw has a smaller cutting width than the second saw, but is arranged to cut the preliminary narrow slot substantially on the center line of the slot made in the finishing cut by the second saw, and wherein the second saw is a climb cutting saw and the first mentioned means is so timed in relation to the last mentioned means as to have the first saw at the entry end of the slot cut substantially to the full ultimate depth of the slot but at the outgoing end cut substantially less than the full depth, whereby the climb cutting second saw is always certain to clip off any burr at the outgoing end of the slot produced by the first saw.

References Cited
UNITED STATES PATENTS

| | | | |
|---|---|---|---|
| 314,936 | 3/1885 | Harvey et al. | 10—6 |
| 358,158 | 2/1887 | Lidback | 10—5 |
| 1,252,884 | 1/1918 | Chase | 10—6 |
| 1,269,370 | 6/1918 | Botenstein | 10—5 |
| 1,408,916 | 3/1922 | Wilcox | 10—20.5 |
| 1,629,705 | 5/1927 | Holmberg et al. | 10—6 |
| 1,931,699 | 10/1933 | Hubbell | 10—6 |
| 2,531,240 | 11/1950 | Wilcox | 10—6 |
| 2,890,468 | 6/1959 | Arnold et al. | 10—6 |
| 3,036,317 | 5/1962 | Megel et al. | 10—5 |

RICHARD J. HERBST, Primary Examiner

E. M. COMBS, Assistant Examiner